US00RE34212E

United States Patent [19]

Potts

[11] E Patent Number: Re. 34,212

[45] Reissued Date of Patent: Apr. 6, 1993

[54] UPPER BODY EXERCISE APPARATUS

[75] Inventor: Lanny L. Potts, Tulsa, Okla.

[73] Assignee: Tri-Tech, Inc., Tulsa, Okla.

[21] Appl. No.: 689,670

[22] Filed: Apr. 23, 1991

Related U.S. Patent Documents

Reissue of:

[64] Patent No.: 4,846,458
Issued: Jul. 11, 1989
Appl. No.: 82,347
Filed: Aug. 6, 1987

[63] This is a continuation of reissue application Ser. No. 441,011, Nov. 20, 1989, now abandoned.

[51] Int. Cl.[5] ..... A63B 21/00

[52] U.S. Cl. ..... 482/26; 482/41; 482/113

[58] Field of Search ..... 272/62, 63, 65, 66, 272/70, 93, 97, 130, 144, 134; 187/17; 482/26, 30, 38, 41, 42, 51, 71, 112, 113, 133, 142, 148, 4, 5

[56] References Cited

U.S. PATENT DOCUMENTS 3,062,542 11/1962 Evancha .
3,511,500 5/1974 Dunn .
3,529,474 9/1970 Olson et al. .
3,592,465 7/1971 Fulkerson, Jr. .
3,701,529 10/1972 Kruthaupt .
3,707,285 12/1972 Martin .
3,716,231 2/1973 Martin .
3,970,302 7/1976 McFee .
4,063,726 12/1977 Wilson .
4,111,414 9/1978 Roberts .
4,235,437 11/1980 Ruis et al. .
4,325,547 4/1982 Cook .
4,341,380 7/1982 Saunder .
4,452,447 6/1984 Lepley et al. .
4,470,597 9/1984 McFee .
4,576,539 3/1986 Williams .
4,645,197 2/1987 McFee .
4,687,195 8/1987 Potts .
4,708,338 11/1987 Potts .

*Primary Examiner*—Robert Bahr
*Attorney, Agent, or Firm*—Townsend and Townsend

[57] ABSTRACT

An upper body exercise apparatus to assist an exerciser to do chin-ups and dips. The apparatus includes a frame having a base, a platform parallel to the base for the exerciser to stand on, chin-up handles and dip handles extending from the frame, a system to oscillate the platform vertically between a lower position and an upper position while maintaining the platform parallel to the base and while avoiding any angular displacement, a pneumatic cylinder for providing a force to the oscillating system which is opposite the weight of the exerciser, and a control and monitor whereby the force is controlled and the oscillation of the platform is monitored.

18 Claims, 9 Drawing Sheets

UPPER BODY EXERCISE APPARATUS

Matter enclosed in heavy brackets [ ] appears in the original patent but forms no part of this reissue specification; matter printed in italics indicates the additions made by reissue.

*This is a continuation of reissue application Ser. No. 07/441,011, filed Nov. 20, 1989, now abandoned.*

FIELD OF THE INVENTION

The present invention relates to an exercise apparatus for the upper body muscles that provides an upward, vertical force which is uniform at all times to assist an exerciser with chin-ups and dips.

BACKGROUND OF THE INVENTION

It is normally difficult for the average exerciser to perform chin-up or dip exercises since strong upper body muscles are required. In most, the upper body muscles are not sufficiently developed. Even if the exerciser can manage a few, repetitions are desirable to develop muscle strength and stamina and to achieve aerobic benefits. Accordingly, the present invention addresses this problem by assisting the exerciser.

It is a principle object and purpose of the present invention to provide an exercise apparatus for the upper body muscles which assists an exerciser to perform chin-ups and dips by providing an upward assistance force opposite the force of gravity.

It is a further object and purpose of the present invention to provide an exercise apparatus for the upper body muscles that provides an upward assistance force which is uniform at all times during an exercise.

It is an additional object and purpose of the present invention to provide an exercise apparatus for the upper body muscles having a platform for an exerciser to stand on that travels in a vertical path without angular displacement.

A patentability search was conducted on the present invention and the following U.S. Patents were uncovered in the search:

| PATENTEE | U.S. PAT. NO. | ISSUE DATE |
|---|---|---|
| Roberts | 4,111,414 | September 5, 1978 |
| Lepley et al | 4,452,447 | June 5, 1984 |
| McFee | 4,470,597 | September 5, 1984 |
| Martin | 3,707,285 | December 26, 1972 |
| Martin | 3,716,231 | February 13, 1973 |
| Fulkerson, Jr. | 3,592,465 | July 13, 1971 |
| Cook | 4,325,547 | April 20, 1982 |

Roberts (U.S. Pat. No. 4,111,414) illustrates the present state of the art regarding upper body exercise devices. A loop harness for the legs of the exerciser is attached to a cable which goes around an overhead pulley. The device is difficult to get into. The weights must be set before the exerciser puts his or her legs into the harness: therefore, the exerciser must pull down the harness while inserting his or her legs. This is to be contrasted with the simple mounting procedure of the present invention. Additionally, the height of the chin-up bar must be adjusted for each exerciser.

McFee (U.S. Pat. No. 4,470,597) illustrates some of the problems which the present invention overcomes. An oscillating platform is articulated to parallelogram arm assemblies for knee flexibility exercises. FIG. 3 of McFee shows that there is angular displacement of the platform 13 during its movement from a lower position to an upper position. This is necessarily so since the back pivot points 19 are fixed. In the present invention, the platform travels in a vertical path with no angular displacement of the platform: The angular displacement occurs at the back pivot points. Angular displacement of the platform would be undesirable since the feet would move in an arc while the hands are planted on either the chin-up or dip handles.

In Lepley (U.S. Pat. No. 4,452,447), a platform for ankle exercises has three hydraulic cylinders which allow movement of the platform in three directions. Lepley provides resistance so that the force of the foot pushes fluid back into a reservoir. The present invention, conversely, decreases the amount of work necessary by assisting the exerciser.

In the Martin U.S. Pat. Nos. 3,707,285 and 3,716,231 a chin-up and dip exercise device has a platform attached to elastic spring members which provide an upward assistance force. Since the elastic members behave in a manner similar to springs, the amount of upward assistance force will vary depending upon the distance the member is stretched from its equilibrium position. Therefore, the upward assistance force will vary during the movement of the platform. In the present invention, the amount of upward assistance force is maintained uniform during the course of movement of the platform.

SUMMARY OF THE INVENTION

Two separate exercises can be performed with the exercise apparatus of the present invention - dips and chin-ups. A top pair of handles extending from the apparatus is used for chin-ups and a lower pair of handles extending from the apparatus is used for dips.

An L-shaped platform has one portion parallel to the floor and another portion perpendicular to the floor. The platform oscillates vertically between a lower position adjacent or on the floor and an upper position. The platform is pivotally connected to a moment arm beam. The platform is also pivotally connected to a pair of parallel support arms. The moment arm beam and the support arms are parallel to each other and form a parallelogram with the perpendicular portion of the platform and a pair of rear upright support members, each of which is articulated where the lower arm is connected thereto. The moment arm beam is pivotally connected to the rear upright support members. The rear upright support members are each pivotally connected to the base of the apparatus.

Additional support is provided by a pair of struts which extend from the rear upright support members. The struts are pivotally connected to a pair of parallel front upright support members which, in turn, are pivotally connected to the base of the apparatus. Finally, a pair of stabilizer arms extend between and are pivotally connected with the support arms and frame posts rising vertically from the base.

The base of the apparatus includes a pair of parallel pedestals and three parallel connectors extending therebetween. Extending vertically from the base are four frame posts. The chin-up handles and dip handles extend from the frame posts and are generally perpendicular therewith.

A pneumatic cylinder has its base pivotally connected to a connector and its ram pivotally connected to the beam. The upward force of the ram is imparted to the beam and, in turn, to the platform. The pneumatic cylinder is connected through an air line to an accumulator and an air compression motor. Standard household electric service powers the air compression motor. To decrease the pressure in the cylinder and the force of the ram, a bleed valve is provided.

The cylinder, accumulator and air compression motor are regulated by a computer control and monitor console located at approximately eye level for the exerciser. The apparatus operates as a tuned system so that upward force assisting the exerciser is maintained constant during oscillation of the platform. Two factors are at work against each other in order to achieve the constant force. In the absence of other factors, the assisting force would decrease as the ram extends and the combined volume of the cylinder and accumulator increases. Conversely, the length of the moment or lever arm is increased as the platform is raised. The assisting force would increase due to the increasing torque as the platform is raised. With these two factors arranged or tuned, the upward assistance force is maintained constant or uniform during oscillation of the platform.

In operation, the exerciser is lifting the difference between the downward force exerted on the exerciser by gravity and the upward assistance force. During the exercises, the platform moves in only a vertical path without any horizontal or angular displacement. No adjustment of the handles in ever required since the movable platform accommodates the varying heights and arm lengths of individual exercisers.

DETAILED DESCRIPTION OF THE PREFERRED EMBODIMENTS

Figure 1:
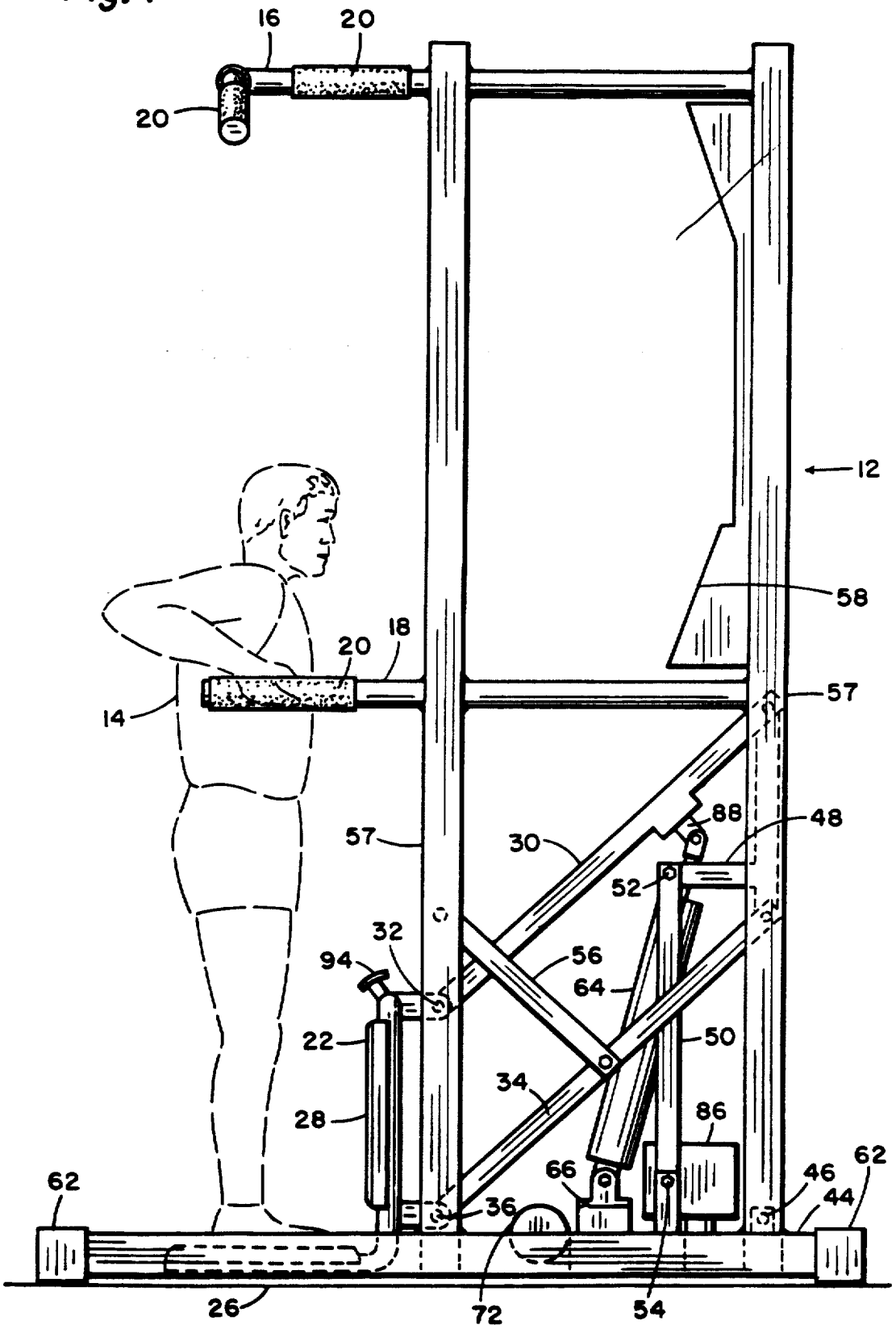
FIG. 1 is a right side elevation view of an upper body exercise apparatus constructed in accordance with the present invention having a platform in the initial or start position.
Figure 2:
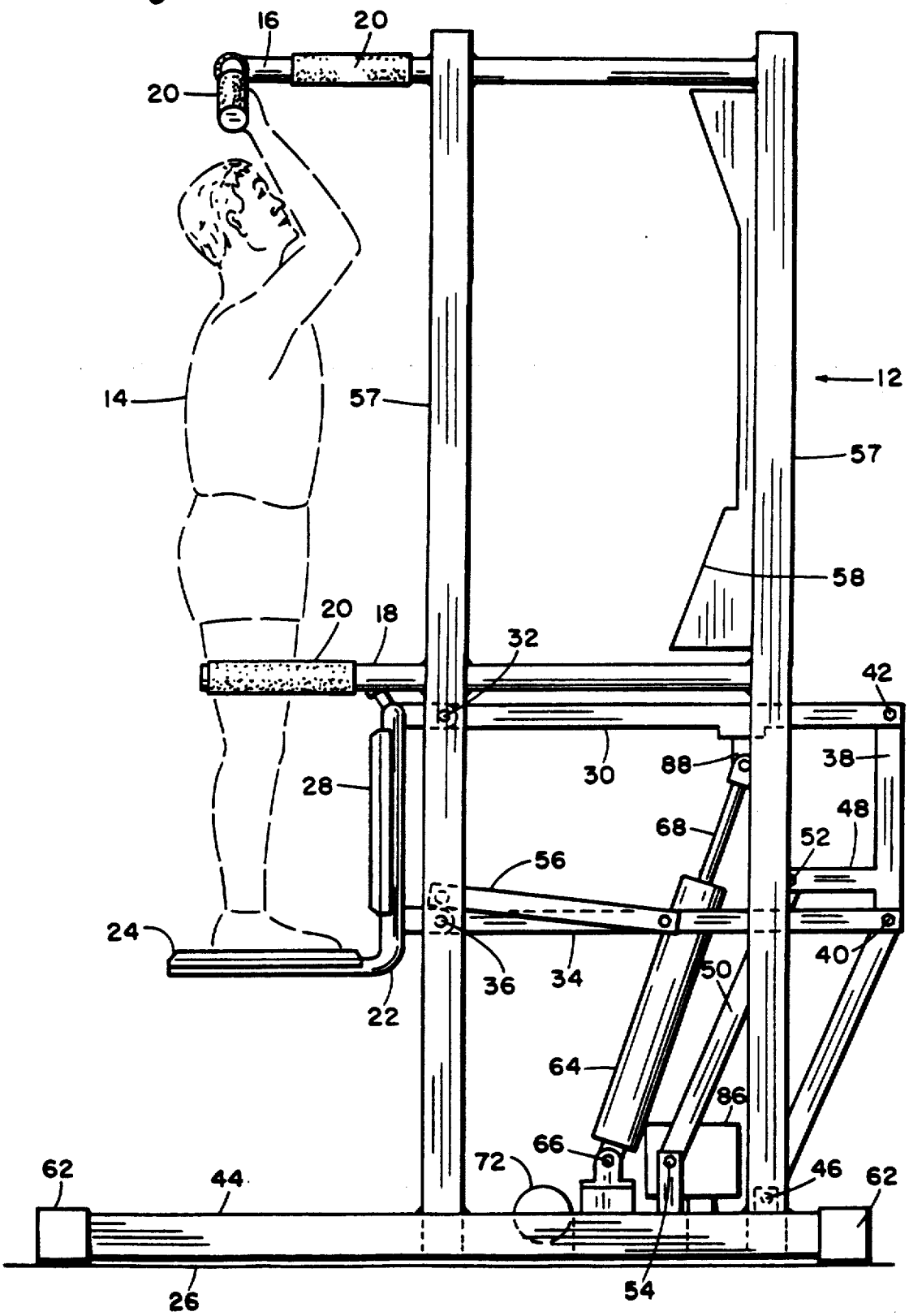
FIG. 2 is a right side elevation view of the present invention shown in FIG. 1 with the platform raised.
Figure 3:
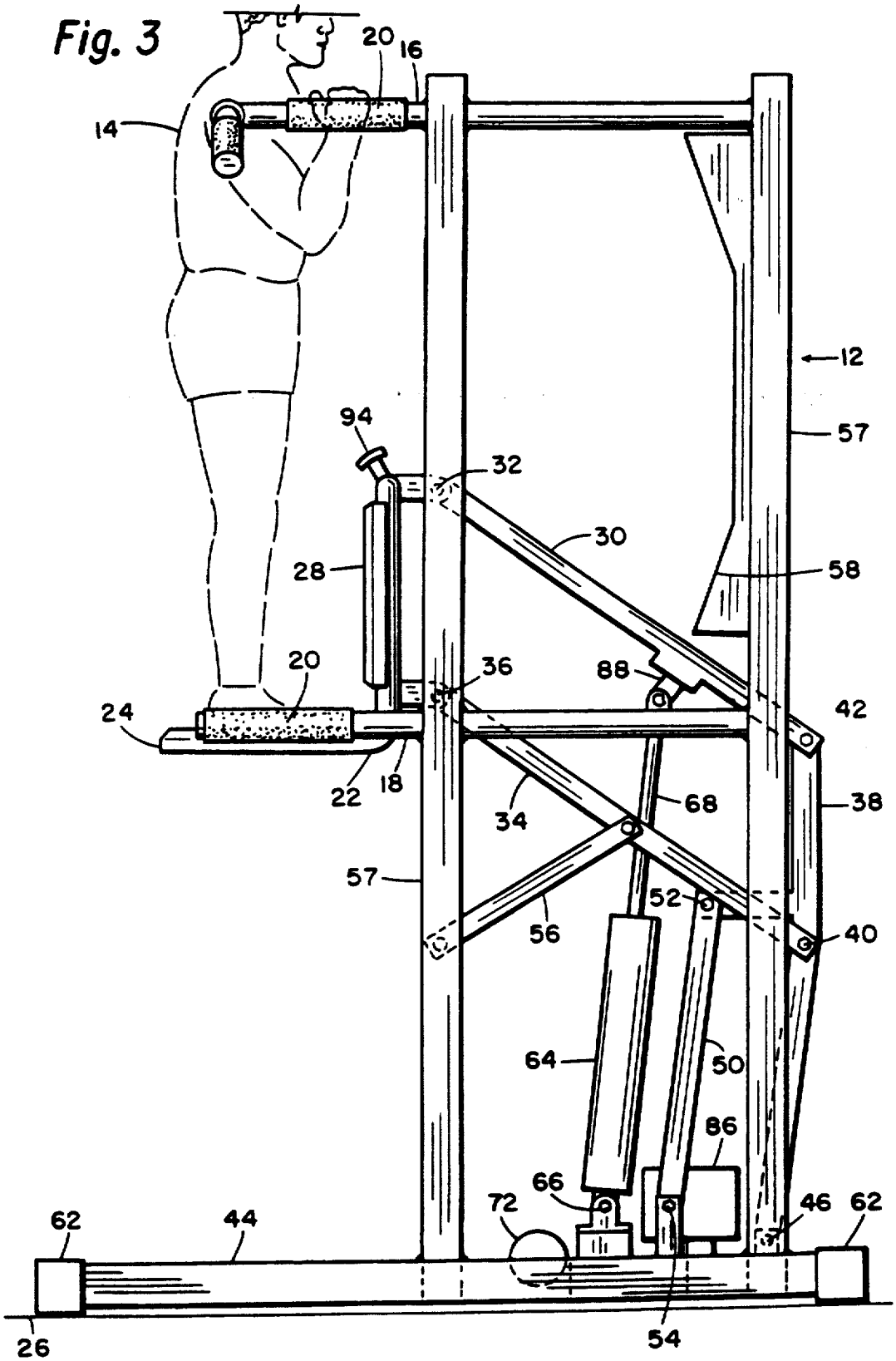
FIG. 3 is a right side elevation view of the present invention with the platform raised above the position in FIG. 2.

Referring to the drawings in detail, FIGS. 1, 2 and 3 show a side view of an exercise apparatus 12 with an exerciser 14 in a different position in each figure.

Two exercises can be performed with the exercise apparatus 12 - dips and chin-ups. The exerciser 14 begins a dip with the arms extended downward, the hands gripping bars or handles, and the feet off the floor. The exerciser then lowers his or her body by bending the arms at the elbows and then lifts his or her body back to the starting position. With chin-ups, the exerciser grasps handles or bars above his or her head, and then pulls his or her body upward from a lower position. In each case, the exerciser is lifting his or her body against the force of gravity. Through repetitions of the exercises, strength and stamina are developed.

In the present invention, a top pair of handles 16 are used for chin-ups and a lower pair of handles 18 are used for dips. The handles extend from the apparatus 12 and may be covered by grips 20 to prevent the hands from slipping.

An L-shaped platform 22 is provided with one portion 24 parallel to the floor 26 and one portion 28 perpendicular to the floor. Initially, the platform rests on or adjacent to the floor, as best seen in FIG. 1, so that the exerciser may easily mount the apparatus. The platform is allowed to oscillate vertically between a lower position, shown in FIG. 1, and an upper position, shown in FIG. 3. The L-shaped platform is of sturdy construction and can easily accommodate an exerciser standing thereon.

Platform 22 is pivotally connected to a moment arm beam 30 at joints 32. The platform 22 is also pivotally connected to a pair of lower arms 34 at joints 36. The lower arms are parallel to each other and parallel to the moment arm beam. The moment arm beam and lower arms form a parallelogram with the perpendicular portion 28 of the platform and a pair of rear upright support members 38, each of which is articulated at joint 40. The moment arm beam 30 is pivotally connected to the rear upright support members at joints 42. The rear upright support members 38 are each pivotally connected to base 44 of the apparatus at joints 46. Additional support is provided by a pair of struts 48 which extend from the rear upright support members 38. The struts 48 are pivotally connected to a pair of parallel front upright support members 50 at joints 52. The front upright support members 50 are pivotally connected to the base 44 at joints 54. A pair of stabilizer arms 56 extend between and are pivotally connected with the lower arms 34 and frame posts 57.

Figure 4:
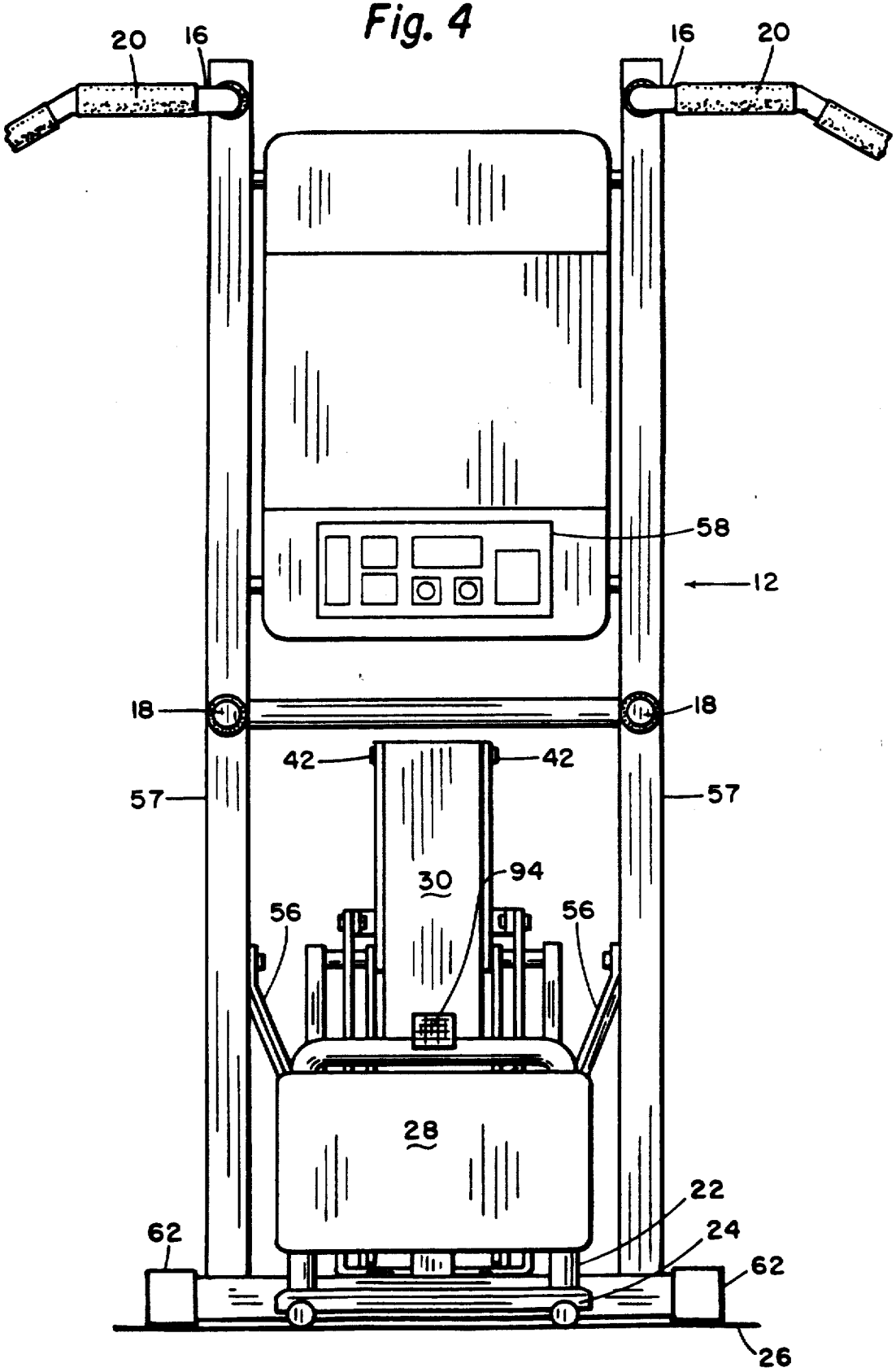
FIG. 4 is a front view of the present invention shown in FIG. 1.

A front view of the apparatus is seen in FIG. 4. A computer control and monitor console 58, to be described in detail, is located at approximately eye level for the exerciser 14.

Figure 5:
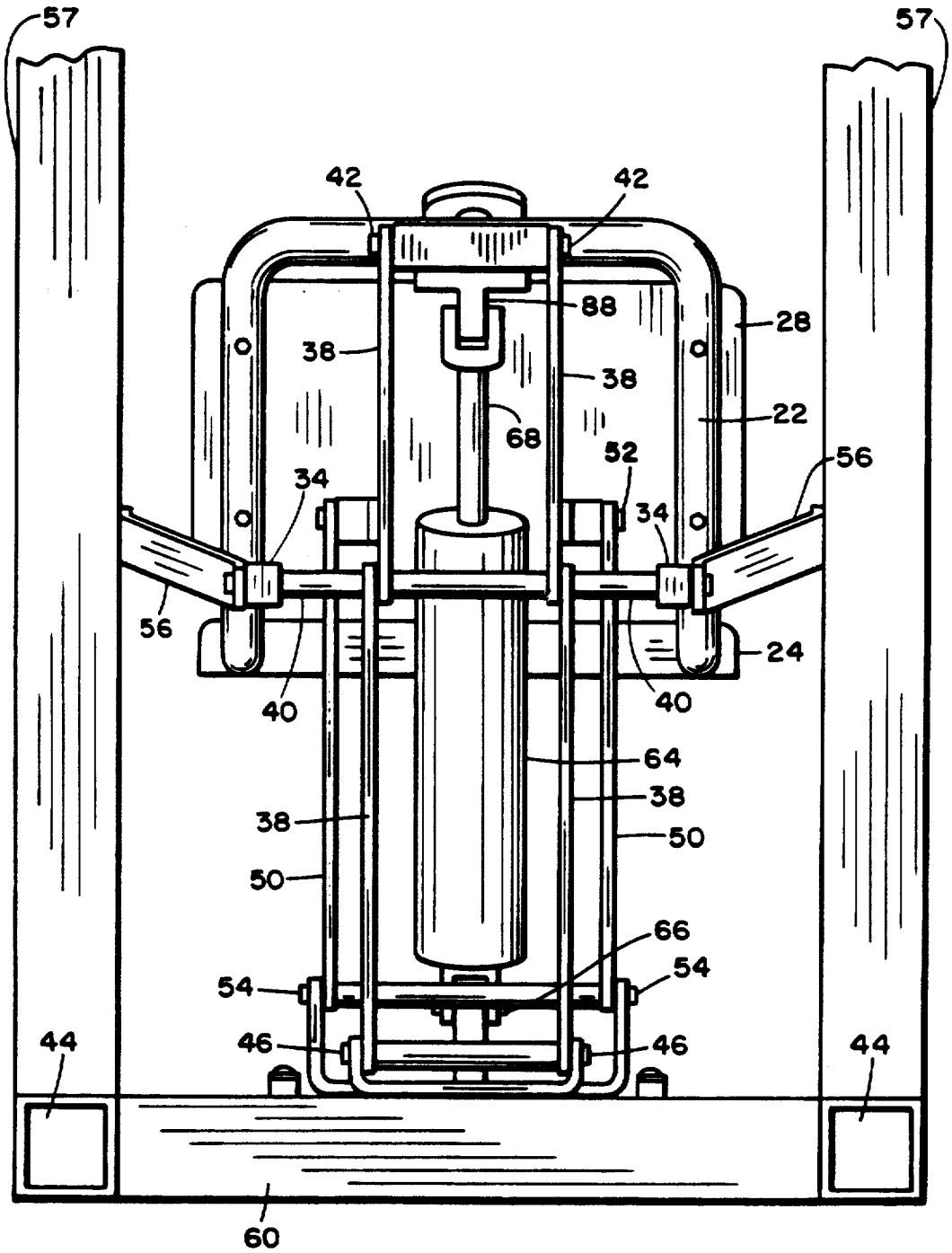
FIG. 5 is a sectional view of the present invention taken along section line 5—5 of FIG. 2.
Figure 6:
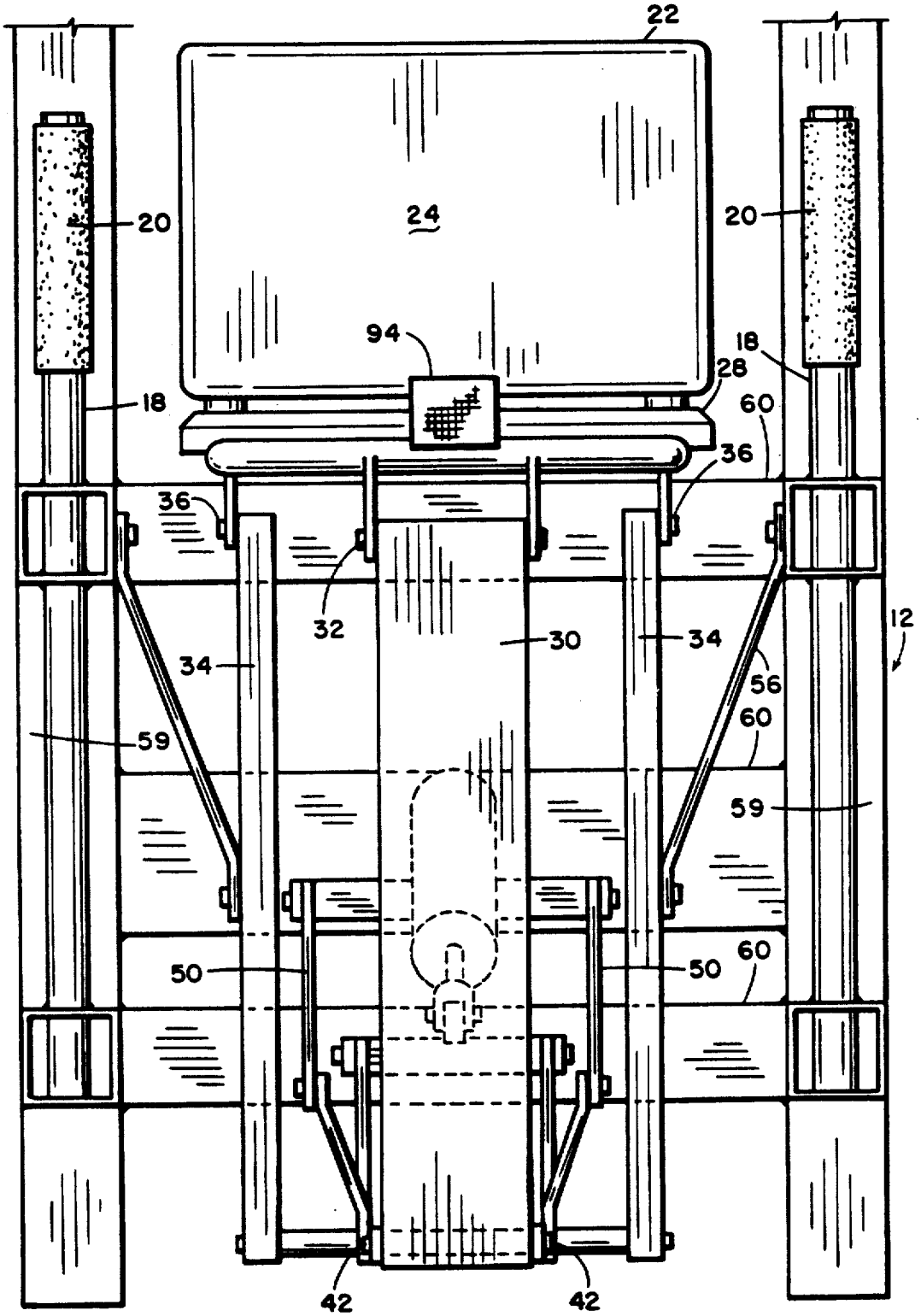
FIG. 6 is a section view of the present invention taken along section line 6—6 of FIG. 5.

FIGS. 5 and 6 show a partial rear view of the apparatus and a cut-away view, respectively. The base 44 of the apparatus, as best seen in FIG. 6, includes a pair of parallel pedestals 59 and three parallel connectors 60 extending therebetween. The pedestals 59 have rubber caps 62 which rest on the floor 26. Extending vertically from the base 44 are the frame posts 57. The chin-up handles 16 and dip handles 18 extend from the frame posts 57 and are generally perpendicular therewith.

Figure 7:
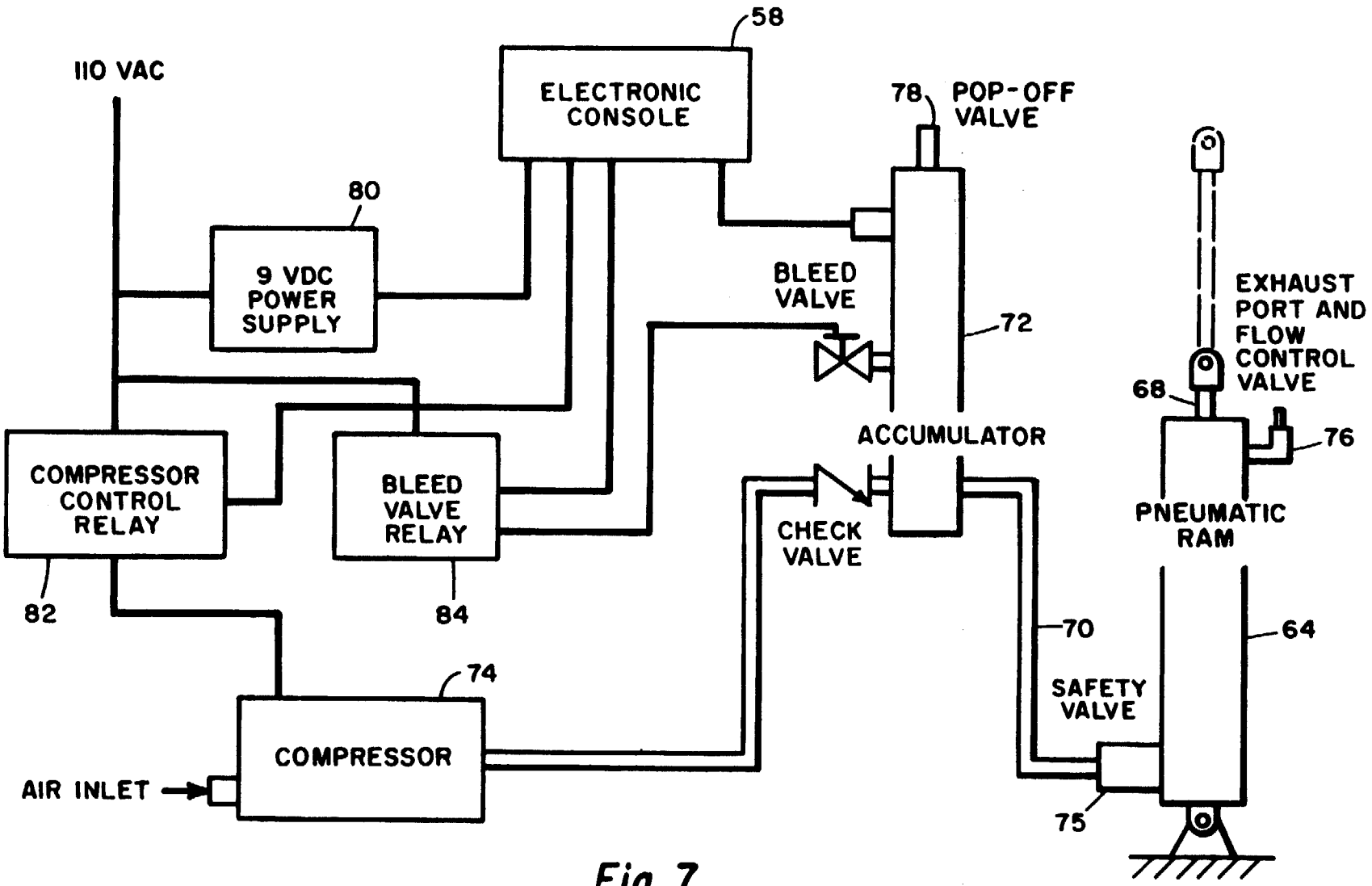
FIG. 7 is a block diagram showing the pneumatic and control system of the present invention.

Returning to a consideration of FIGS. 1, 2, 3 and 5, the means by which an upward force is imparted to the platform 22 can be seen. A pneumatic cylinder 64 has its base pivotally connected to a connector 66 and its ram 68 pivotally connected to the beam 30. The connector is secured to one of the parallel connectors 60 of the base. The upward force of the ram is imparted to the beam and, in turn, to the platform. The beam acts as the moment or lever arm which imparts torque to the platform. The pneumatic cylinder operates in a standard manner. As best seen in the block diagram of FIG. 7, the pneumatic cylinder is connected through an air line 70 to an accumulator 72 and an air compression motor 74. The accumulator acts as a reservoir for the air pressure.

Other means to impart an upward force may be utilized, however, a pneumatic cylinder has been found particularly suited to the present application. A hydraulic system, for instance, raises the possibility of a water or fluid leak in the exercise area.

Standard 110 volt household electric service powers the air compressor motor 74. A safety valve 75 in the air line decreases the pressure in the cylinder and the force of the ram if excessive pressure is reached.

Three safety features are built into the system. These are provided in the event the user steps off or falls off the platform prior to decreasing the pressure. If the velocity of the ram exceeds a certain speed, a flow control valve 76 connected to the cylinder will close. Additionally, a pop-off valve 78 is provided on the accumulator 72 if the pressure exceeds maximum safe pressure. Finally, if the velocity of air through the air line 70 exceeds a certain speed, the safety valve 75 will open.

The cylinder 64, accumulator 72 and air compression motor 74 are regulated by the computer control and monitor console 58. A transformer 80 converts the household electric service to nine volts direct current to power the control and monitor console 58. A compressor control relay 82 and a bleed valve relay 84, in parallel with each other, are wired to the household electric service. The compressor control relay 82 and the bleed valve relay 84 are also wired to the control and monitor console 58.

Returning to a consideration of FIGS. 1, 2, and 3, the transformer 80, compressor control relay 82 and a bleed valve relay 84 are contained in a box 86 at the base 44 of the apparatus.

The apparatus 12 operates as a tuned system so that the upward force assisting the exerciser 14 is maintained constant or uniform during oscillation of the platform from its lowermost position to its uppermost position. Two factors are at work against each other to achieve a constant force.

In the absence of other factors, the assisting force would decrease as the ram 68 extends and the platform 22 moves upward. As the ram extends, the combined volume of the cylinder 66 and accumulator 72 increases. Boyle's gas law provides that the volume of a gas varies inversely to the pressure provided the gas and temperature of the mass are maintained constant. As the volume increases, therefore, the pressure decreases and the assisting force decreases. The size of the accumulator will determine the rate of change in the force. The accumulator 72 is chosen with a volume so that the force decreases at a desired rate.

Figure 8:
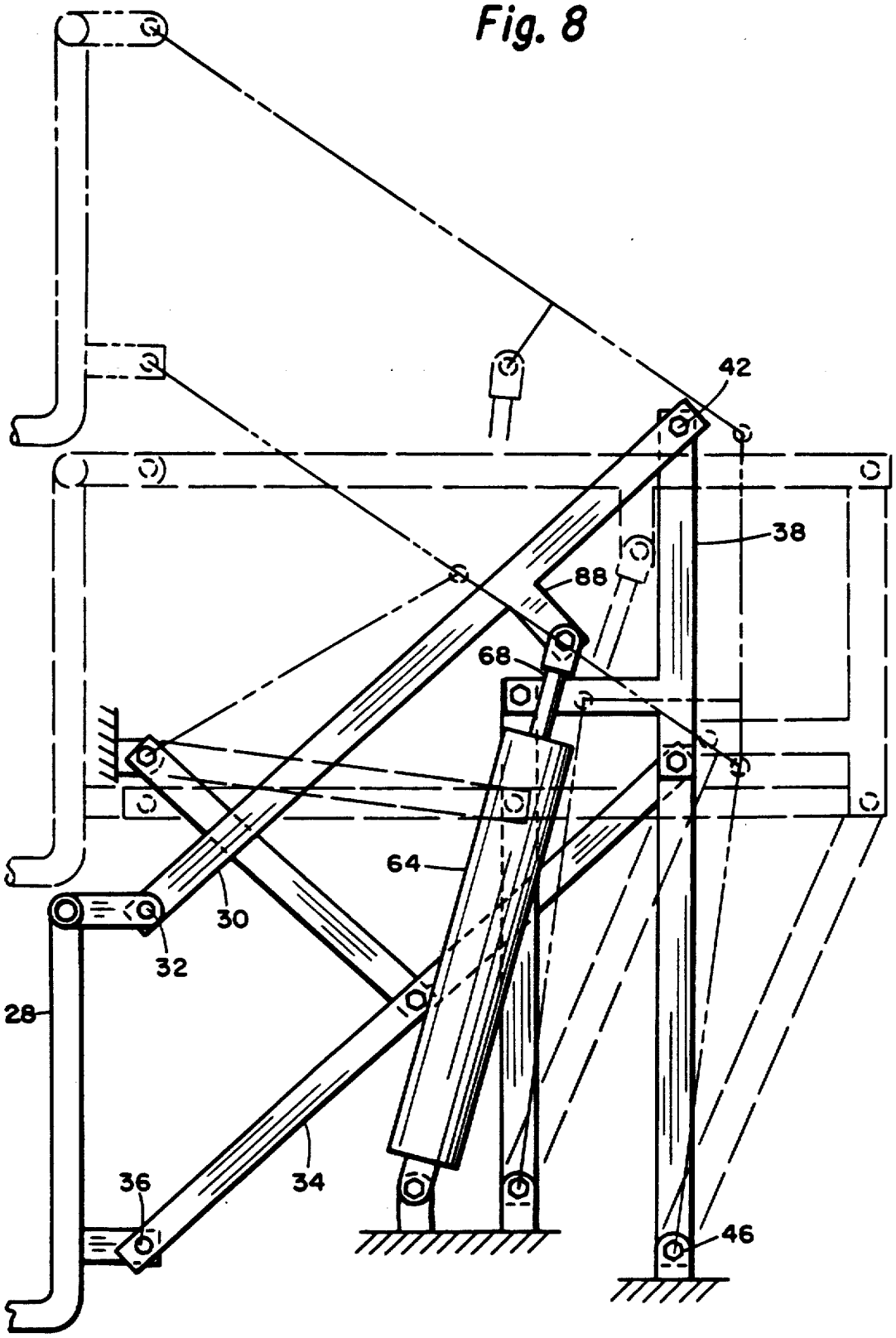
FIG. 8 is a view of the platform of the present invention in each of the three positions shown in FIGS. 1, 2, and 3.

A countervailing factor exists concerning the torque. Returning to a consideration of FIGS. 1, 2, and 3, FIG. 8 shows the platform in three positions, and the effect due to the torque can be seen. Torque is equal to the length of the moment arm times the upward force times the sine of the angle between them. The beam 64 acts as the lever or moment arm and the force is supplied by the ram 68 and its cylinder 66 previously described. It is critical to note that the ram is not connected directly to the beam: rather, both are connected to an intermediate ear 88. As best seen in FIG. 8, the effective point of connection between the ram 68 and the beam 30 is found by extending an imaginary axis of the ram to the beam, ignoring the ear. When this is done, it can be seen that the effective connection point changes as the platform oscillates. As the platform rises, the distance between the effective connection point and the end of the beam 30 at joint 42 increases. In the absence of other changes, the torque increases as the platform rises and the torque decreases as the platform is lowered.

With these two countervailing factors tuned, the upward assistance force is maintained constant or uniform during the entire oscillation of the platform.

Figure 9:
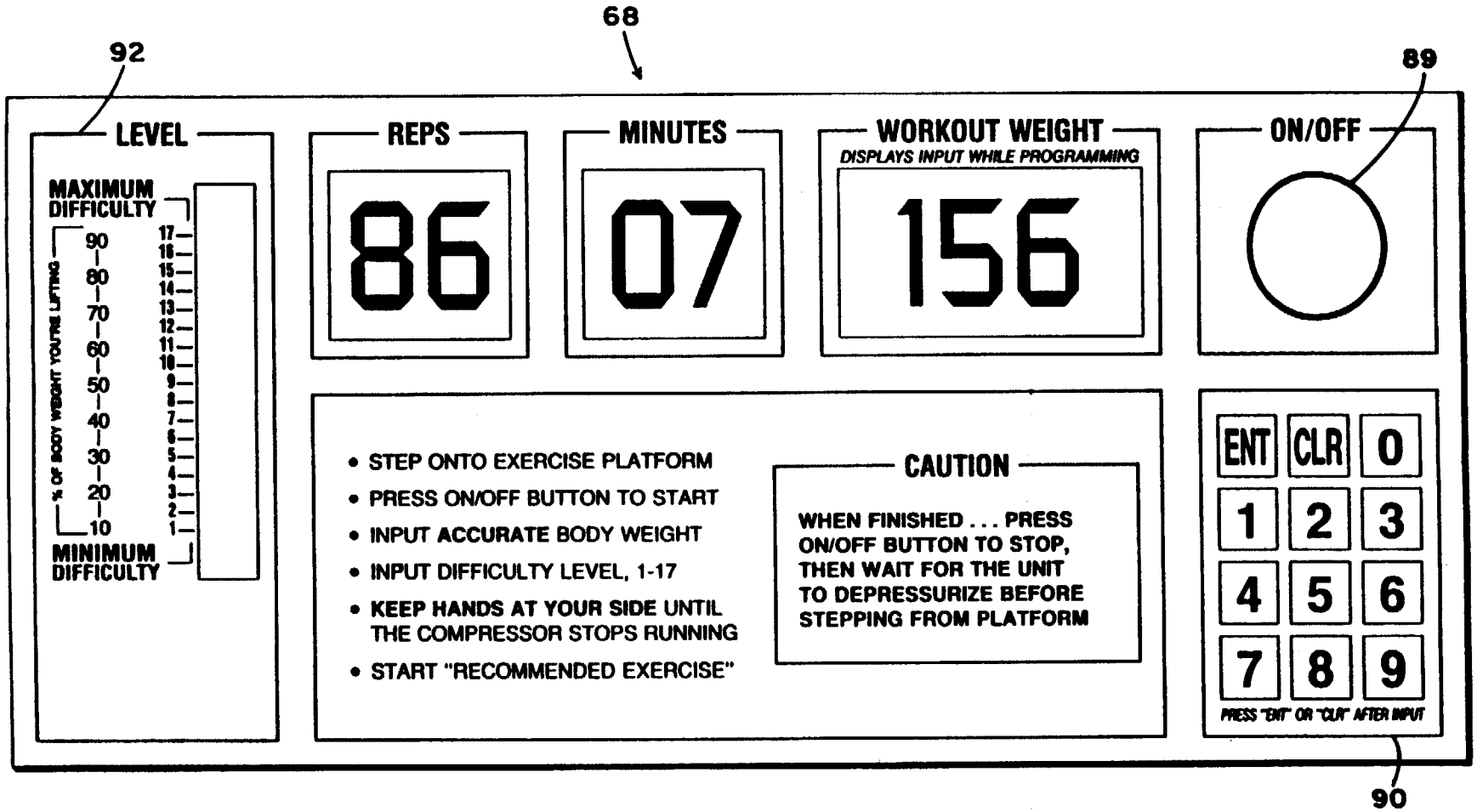
FIG. 9 is an enlarged view of a control and monitor console of the present invention.

In operation, the exerciser 14 steps up on the platform 22 facing the control and monitor console 58. An enlarged view of the console, which may take various forms and configurations, is seen in FIG. 9. After the apparatus is turned on with button 89, the exerciser enters his or her weight through the use of a key pad 90. The exerciser then enters the amount of upward assistance force desired by adjusting the percentage of assistance on bar graph 92. The net weight to be lifted will then be displayed. As the exercises are performed, the number of repetitions and the time spent on the apparatus will also be displayed.

To perform dips, the exerciser simply grasps the dip handles 18 and pushes upward to the starting position. To perform chin-ups, the exerciser grasps one or both dip handles and places one foot on a rubber foot pedal 94 on the perpendicular portion 28 of the platform. Using the foot pedal as a step, the exerciser grasps the chin-up handles 16 as shown in FIGS. 2 and 3. Three different types of chin-ups may be performed by grasping the chin-up handles 16 in different locations as readily seen in FIG. 4. After completing the exercise, the exerciser will decrease the assistance to 0% before stepping off.

It can be appreciated that with the hands grasping the handles in any of the exercises, it is critical that the platform move in only a vertical path without any horizontal or angular displacement. Returning to a consideration of FIG. 8, it can be seen that all of the angular displacement is relegated to the rear upright support members 38 so that the platform 22 travels in a vertical path.

It can also be appreciated that no adjustment of the height of the handles 16 or 18 is ever required, since the movable platform accommodates the varying heights and arm lengths of individual exercisers.

Whereas the present invention has been described in relation to the drawings attached hereto, it should be understood that other and further modifications, apart from those shown or suggested herein, may be made within the spirit and scope of this invention.

What is claimed is:

1. An upper body exercise apparatus to assist an exerciser to do chin-ups and dips which comprises:

(a) a frame having a base;

(b) a platform parallel to said base for said exerciser to stand on;

(c) chin-up handles and dip handles extending from said frame;

(d) means to oscillate said platform vertically between a lower position and an upper position while maintaining said platform parallel to said base and while avoiding any horizontal displacement;

(e) means pivotally mounted at one end to said base and at the other end to said oscillating means to provide a force to said oscillating means opposite the force of gravity on the exerciser; and (f) control and monitor means whereby said force is controlled and the oscillation of said platform is monitored.

2. A upper body exercise apparatus as set forth in claim 1 wherein said means to provide a force opposite the force of gravity includes a pneumatic cylinder, compression motor means and accumulator means.

3. An upper body exercise apparatus as set forth in claim 2 wherein said control and monitor means regulates said pneumatic cylinder, said compression motor means and said accumulator means, and includes a keypad to enter information and instructions.

4. An upper body exercise apparatus as set forth in claim 1 wherein said means to oscillate said platform vertically includes a moment arm beam pivotally attached at one end to said platform, a pair of upright support members parallel to each other, each member pivotally attached to one end to said base and pivotally attached at the other end to said moment arm beam, and a pair of lower support arms parallel to each other, each arm pivotally connected at one end to said platform and pivotally connected at the other end to one of said upright support members.

5. An upper body exercise apparatus as set forth in claim 4 including a pair of stabilizer bars extending between and pivotally attached to said frame and said lower support arms.

6. An upper body exercise apparatus to assist an exerciser to do chin-ups and dips which comprises;

(a) a frame having a base;

(b) a platform parallel to said base for said exerciser to stand on;

(c) chin-up handles and dip handles extending from said frame;

(d) means to oscillate said platform vertically between a lower position and an upper position while maintaining said platform parallel to said base and while avoiding any horizontal displacement;

(e) pneumatic cylinder means pivotally mounted at one end to said base and at the other end to said oscillating means including compression motor means and accumulator means to provide a force to said oscillating means opposite the force of gravity on the exerciser; and (f) control and monitor means whereby said force is controlled and the oscillation of said platform is monitored.

7. An upper body exercise apparatus as set forth in claim 6 wherein said means to oscillate said platform vertically includes a moment arm beam pivotally attached at one end to said platform, a pair of upright support members parallel to each other, each member pivotally attached at one end to said base and pivotally attached at the other end to said moment arm beam, and a pair of lower support arms parallel to each other, each arm pivotally connected at one end to said platform and pivotally connected at the other end to one of said upright support members.

8. An upper body exercise apparatus as set forth in claim 7 wherein said pneumatic cylinder means is connected to said oscillating means at said beam, wherein the effective connection point of said pneumatic cylinder means to said beam varies as the platform oscillates so that the length of the moment arm increases as said platform is raised, and wherein uniformity of said force throughout oscillation of said platform is achieved by combining said pneumatic cylinder means which decreases in force as said platform is raised with said pneumatic cylinder connection means which increases in force as said platform is raised due to the increase in length of said moment arm.

9. An upper body exercise apparatus as set forth in claim 7 including an intermediate ear extending from said moment arm beam and wherein said pneumatic cylinder means is pivotally connected to said oscillating means at said intermediate ear so that the effective connection point of said pneumatic cylinder means to said moment arm beam varies as said platform oscillates in order to increase the length of the moment arm as said platform rises, and wherein uniformity of said force throughout oscillation of said platform is achieved by combining said pneumatic cylinder means which decreases in force as said platform is raised with said means to oscillate said platform vertically which increases in force as said platform is raised.

10. An upper body exercise apparatus as set forth in claim 6 wherein said control and monitor means regulates said pneumatic cylinder means, said compression motor means and said accumulator means.

*11. An upper body exercise apparatus to assist an exerciser, which comprises:*

*(a) a frame having a base;*

*(b) a first exerciser support platform, having an upper surface, said upper surface being parallel to said base, for said exerciser to stand on;*

*(c) at least a first handle extending from said frame;*

*(d) means for oscillating said first exerciser support platform vertically between a lower position and an upper position while maintaining said first exercising support platform parallel to said base and while avoiding any horizontal displacement, and in the absence of a second exercise support platform which moves vertically in a direction opposite the direction of movement of said first exerciser support platform, all of said upper surface occupying a region, when said first exerciser support platform is in said lower position, which is below the region occupied by said upper surface when said first exerciser support platform is in the upper position;*

*(e) means mounted at one end to said base and at the other end to said oscillating means for providing a substantially constant force to said oscillating means having a component opposite the force of gravity on the exerciser during said oscillating from said lower position to said upper position.*

*12. An upper body exercise apparatus to assist an exerciser, which comprises:*

*(a) a frame having a base;*

*(b) a platform parallel to said base for said exerciser to stand on;*

*(c) at least a first handle extending from said frame;*

*(d) means for oscillating said platform vertically between a lower position and an upper position while maintaining said platform parallel to said base, said means for oscillating including a moment arm beam pivotally attached at one end to said platform, a pair of upright support members parallel to each other, each member pivotally attached at one end to said base and pivotally attached to the other end to said moment arm beam, and a pair of lower support arms parallel to each other, each arm pivotally connected at one end to said platform and pivotally connected at the other end to one of said upright support members.*

*13. Apparatus, as claimed in claim 12, further comprising a pair of stabilizer bars extending between and pivotally attached to said frame and said lower support arms.*

*14. An upper body exercise apparatus to assist an exerciser, which comprises:*

*(a) a frame having a base;*

*(b) a platform parallel to said base for said exerciser to stand on;*

(c) *at least a first handle extending from said frame;*

(d) *means for oscillating said platform vertically between a lower position and an upper position while maintaining said platform parallel to said base, said means for oscillating including a moment arm beam pivotally attached at one end to said platform, a pair of upright support members parallel to each other, each member pivotally attached at one end to said base and pivotally attached to the other end to said moment arm beam, and a pair of lower support arms parallel to each other, each arm pivotally connected at one end to said platform and pivotally connected at the other end to one of said upright support members; and*

(e) *force means mounted at one end to said base and at the other end to said oscillating means for providing a force to said means for oscillating having a component opposite the force of gravity on the exerciser.*

*15. Apparatus, as claimed in claim 14, wherein said force means is connected to said means for oscillating at said beam, and wherein the effective connection point of said force means to said beam varies as the platform oscillates so that the length of the moment arm increases as the platform is raised, and wherein substantial uniformity of said force throughout oscillation of said platform is achieved by combining said force means which decreases in force as the platform is raised with said connection means which increases in force as the platform is raised due to the increase in length of said moment arm.*

*16. An exercise apparatus, as claimed in claim 14, including an intermediate ear extending from said moment arm beam and wherein said force means is pivotally connected to said means for oscillating at said intermediate ear so that the effective connection point of said force means to said moment arm beam varies as said platform oscillates in order to increase the length of the moment arm as said platform rises, and wherein uniformity of said force throughout oscillation of said platform is achieved by combining said force means which decreases in force as said platform is raised with said means for oscillating said platform vertically which increases in force as said platform is raised.*

*17. An upper body exercise apparatus to assist an exerciser, which comprises:*

(a) *a frame having a base;*

(b) *a first exerciser support platform, having an upper surface, said upper surface being parallel to said base, for said exerciser to stand on;*

(c) *at least a first handle extending from said frame;*

(d) *means for oscillating said first exerciser support platform vertically between a lower position and an upper position while maintaining said first exerciser support platform parallel to said base and while avoiding horizontal displacement of said first exerciser support platform and in the absence of a second exerciser support platform which moves vertically in a direction opposite the direction of movement of said first exerciser support platform, all of said upper surface occupying a region, when said first exerciser support platform is in said lower position, which is below the region occupied by said upper surface when said first exerciser support platform is in the upper position; and*

(e) *means, operably connected to said oscillating means, for providing a substantially constant force on said exerciser having a component opposite the force of gravity on the exerciser continuously during said oscillating from said lower position to said upper position.*

*18. An upper body exercise apparatus to assist an exerciser, which comprises:* a) *a frame having a base;* b) *a first exerciser support platform having an upper surface, said upper surface being a surface for supporting said exerciser;* c) *at least a first handle positioned in a fixed relationship to said base;* d) *first means for movably connecting said first exerciser support platform to said frame, permitting movement between a lower position and an upper position and in the absence of a second exerciser support platform which moves vertically in a direction opposite the direction of movement of said first exerciser support platform, all of said upper surface occupying a region when said first exerciser support platform is in said lower position, which is below the region occupied by said upper surface when said first exerciser support platform is in the upper position;* e) *means, operably connected to said first means, for providing a substantially constant force opposite the force of gravity on the exerciser continously during movement of said first exerciser support platform from said lower position to said upper position.*

* * * * *